March 3, 1953
C. P. PALMER
2,630,051
LAND CONDITIONING MACHINE
Filed Aug. 19, 1946
3 Sheets-Sheet 3
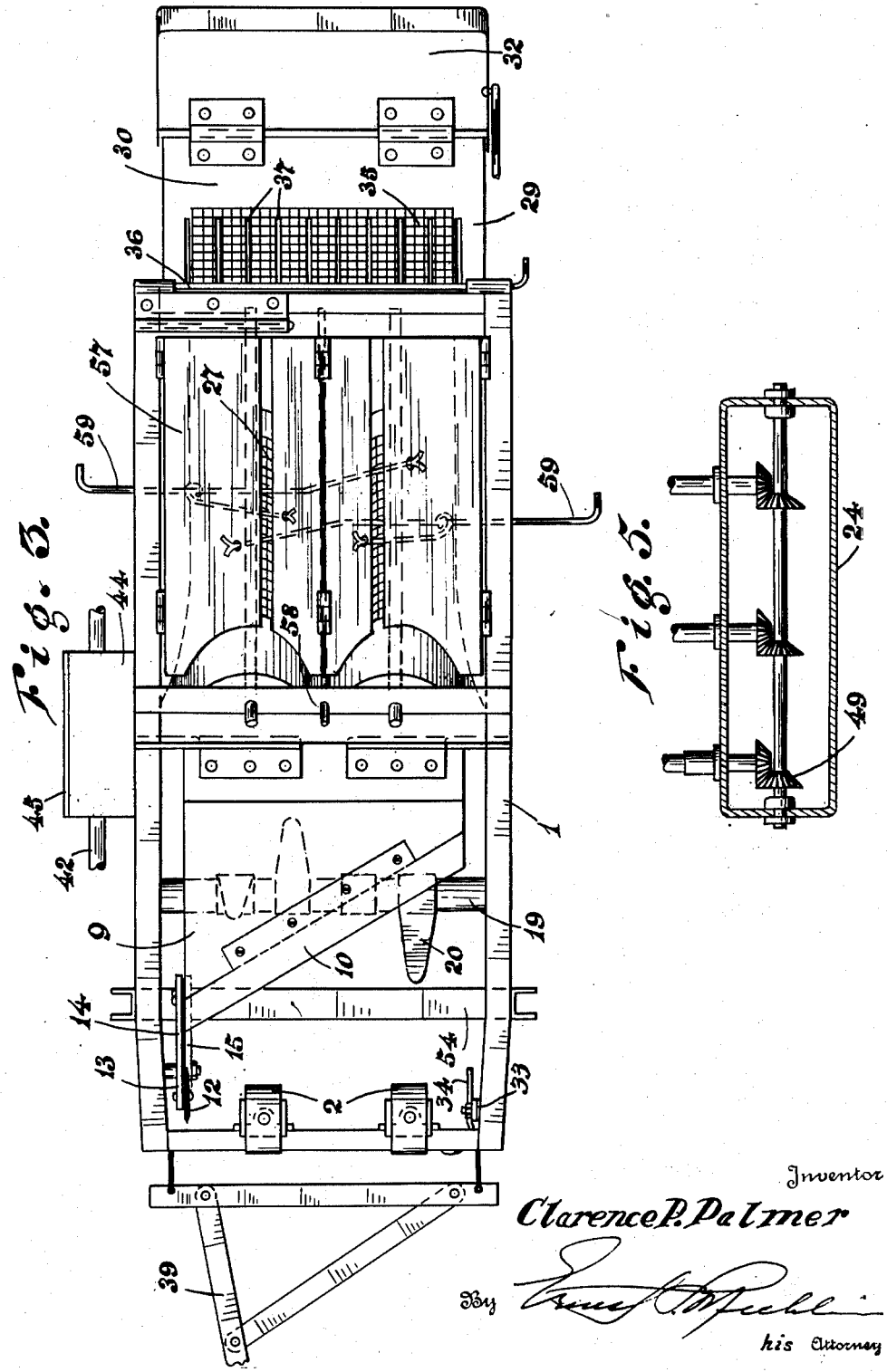
Inventor
Clarence P. Palmer
By
his Attorney Patented Mar. 3, 1953

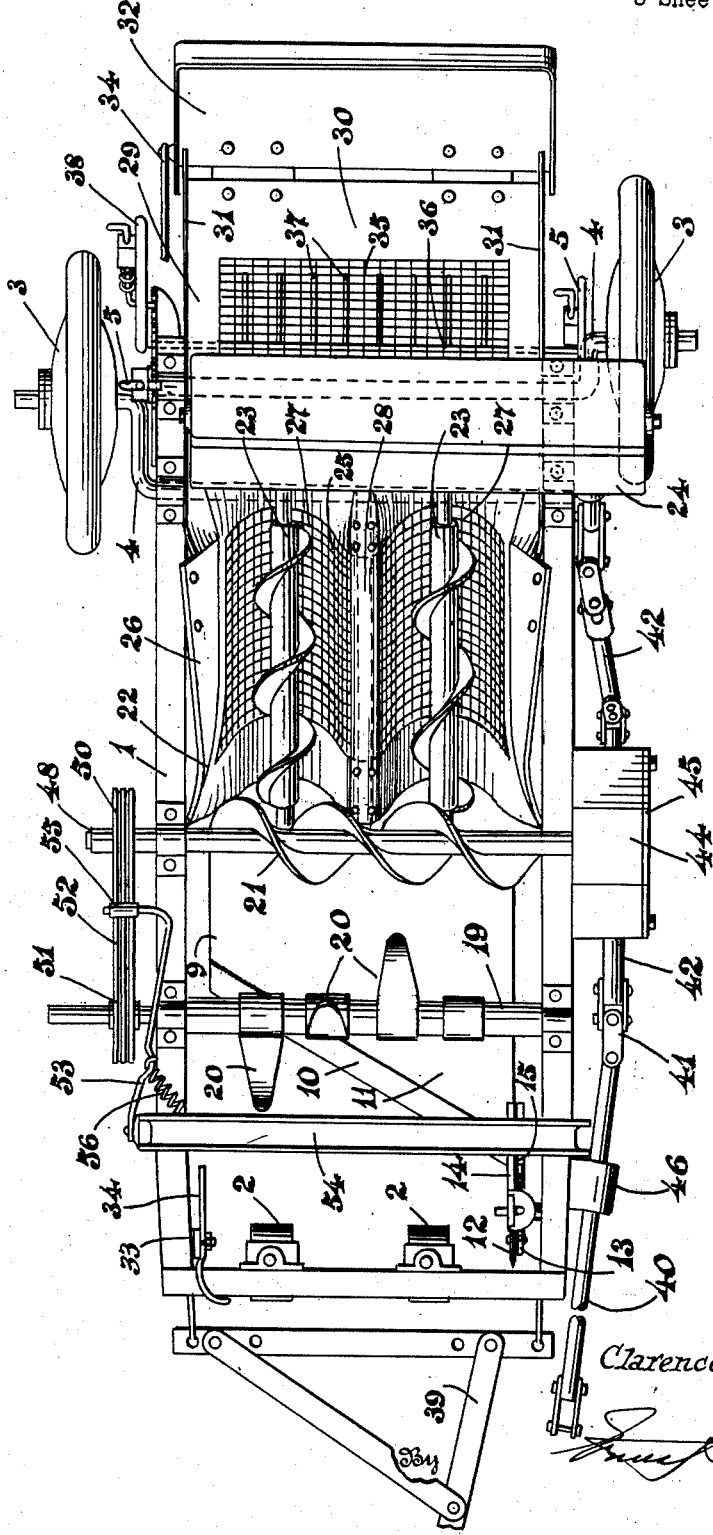

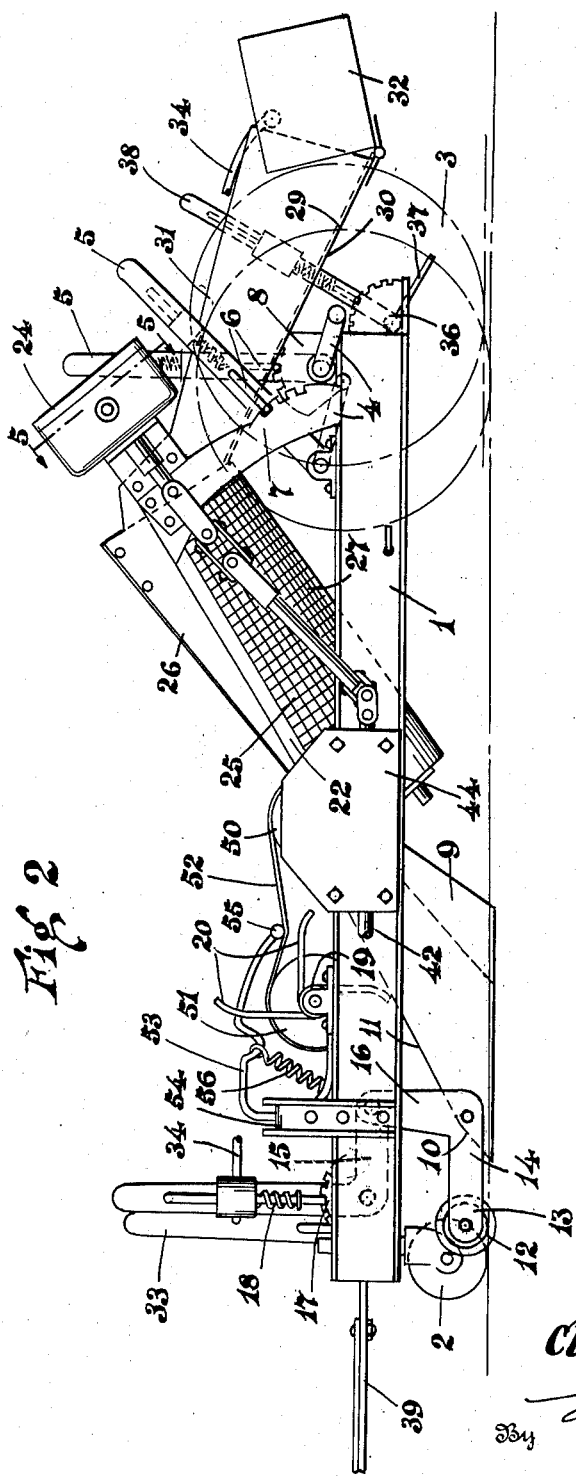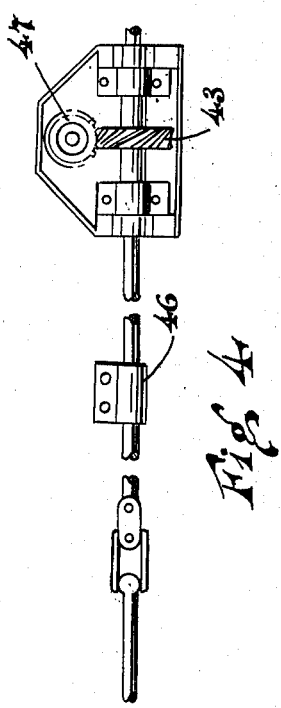

2,630,051

UNITED STATES PATENT OFFICE 2,630,051

LAND CONDITIONING MACHINE

Clarence Patrick Palmer, Fargo, N. Dak.

Application August 19, 1946, Serial No. 691,535

2 Claims. (Cl. 97—10)

This invention relates generally to agricultural implements and more particularly to machines for conditioning land.

In preparing land for cultivation it is customary to subject the ground to several operations, the number and type of which are dependent upon the condition of the land. Plowing and harrowing of some sort are always required and in addition weeds, brush and stones must usually be removed from the soil, particularly if the land is fallow or has not been previously cultivated. In the past it has been customary to conduct the several conditioning operations as a series of separate steps in each of which is utilized an implement designed especially for that purpose. While of little import in home gardening the cost of the equipment and the time and labor consumed in traversing the land as each operation is performed become limiting factors in large scale farming. Consequently several attempts have been made to design machines which combine the functions of several of the ordinary implements. While of advantage, none of these machines has successfully combined the several functions required to completely condition land for cultivation.

The primary object of this invention is to provide an improved machine for completely conditioning land for cultivation in a single operation whether the conditioning is seasonal or applied to fallow or uncultivated ground.

Another object of the invention is to provide a land conditioning machine which, by commingling deep with previously cultivated soil, can plow up deep soil and thus eradicate all weeds without detriment to the immediate productivity of the land.

An additional object of the invention is to provide a land conditioning machine by which the steps of brush removal, weed and stone eradication, plowing, harrowing and ridging of soil to inhibit erosion are performed as a continuous operation whereby a single implement of rugged construction can be employed for completely conditioning land of various types with consequent saving in labor and cost of equipment.

Other objects and advantages will appear hereinafter in the detailed description of the invention, be particularly pointed out in the appended claims, and illustrated in the accompanying drawings in which:

Figure 1 is a top plan view of a preferred embodiment of a land conditioning machine incorporating the invention, with portions removed to more clearly show the details of construction.

Figure 2 is a side elevational view of the machine with portions removed and shown schematically to more clearly show the details of construction.

Figure 3 is a bottom plan view of the machine with portions removed to more clearly show the details of construction.

Figure 4 is a side elevational view of the main drive assembly separate from the machine, with the lid of the gear housing removed to show the details of construction.

Figure 5 is a somewhat horizontal sectional view taken along the lines 5—5 of Figure 2.

Referring now in detail to the drawing, in which like reference characters designate like parts, the improved land conditioning machine has a rectangular frame 1 which is supported at its forward end by one or more freely swinging, preferably vertically adjustable, wheels or rollers 2. The main portion of the load of the machine is supported on a pair of rear wheels 3 which are individually sprung so that they can move independently of and conform to land of different contours without distorting the frame. This can be accomplished by journalling the wheels on separate offset axles 4 which are pivotally attached to the frame. Operating arms or levers 5 are splined or otherwise rigidly attached to the axle shafts, the arms being provided with releasable spring-urged dogs 6 for engaging segment racks designated as 7 and 8, respectively. Thus by movement of the arms the axles will turn and raise or lower the wheels either to vary their relative heights or the clearance between the frame and the ground.

Adjacent the forward end of the frame is removably mounted a plow or scoop 9, preferably of trapezoidal shape, having a diagonally disposed cutting blade or edge 10 and an inclined upper face 11. The plow is hingedly attached at its rear upper edge to a cross member of the frame. To facilitate sharpening the blade may be detachably secured to the plow in the usual manner (not shown), enabling it to be removed readily for sharpening without detaching the plow from the frame. In line with and spaced forwardly of the leading end of the cutting edge of the plow is a rotary cutting or edging wheel 12 which is rotatably mounted on the forward end of the lower arm 13 of an angle or L-shaped member 14, the latter being pivotally attached to one side of the plow. The height of both the cutting wheel and the plow relative to the frame is made adjustable by the provision of an operating arm or bent lever 15 mounted on the frame and pivotally connected to the upper end of the upper arm 16 of the angle member 14 so that backward and forward movement of the operating arm will lower or raise the cutting member and the cutting edge of the plow. By use of a segment rack 17 and a spring-pressed dog 18 on the operating arm the cutter and plow can be locked at any desired height.

Overlying the plow and rotatably mounted on the frame through suitable brackets is a transversely disposed shaft or cylinder 19 having a series of removable teeth or blades 20. The shaft is adapted to rotate in a counter-clockwise direction, the teeth adjacent their outer edges being bent away from their direction of movement. Rearwardly of the shaft 19 and disposed transversely of the frame over the upper rear edge of the plow is rotatably mounted a spiral or screw conveyor 21. Following the plow and partly underlying the transverse conveyor is an upwardly inclined or tilted cradle or platform 22. The forward end of the cradle is suspended from the main frame 1 by appropriate means and preferably extends below the level of the rear upper edge of the plow 9. At its rear end the cradle is spaced somewhat above the main frame and is supported thereon by appropriate brackets or supports, of one of which the segment rack 7 may be formed as an integral part, as shown in Figure 2.

Housed in the cradle and inclined upwardly therewith are a pair of spaced longitudinally extending spiral or screw conveyors 23. The conveyors are journaled at their forward ends to suitable brackets and carried at their rear ends by a gear box 24 mounted on the cradle. The floor or bed 25 of the cradle below its side boards 26 and beneath each of the conveyors is foraminous and formed in the illustrated embodiment as a pair of spaced arcuate channels or troughs 27 of wire mesh or other screening material, reinforced at their centers by a connecting web 28.

At its upper or rear end the floor 25 merges into or joins a downwardly sloped or inclined board or shelf 29 forming the bottom of a chute 30 and confined within side boards 31. A hopper or receptacle 32 for debris is hingedly attached to the rear end of the chute and operated or dumped by an operating lever 33 pivotally mounted on the front end of the main frame 1 through a connecting link or cable 34. Intermediate its ends and preferably rearwardly of the wheels 3, the bottom of the chute is interrupted by a foraminous sheet or screen 35 of wire mesh or like material. On the frame 1 beneath this portion of the chute is rotatably mounted a ridging or raking device 36 having a plurality of tines or teeth 37. Through the operating handle 38 the tines can be rotated from their normal position parallel to the underside of the frame downwardly through substantially a 90° angle.

The land conditioning machine is designed to be pulled or towed by a tractor to which the frame 1 is adapted to be connected through a draw bar 39. While it is possible to operate the spiral conveyors by suitable gear connections with one of the rear wheels 3, utilizing wheel cleats to minimize slippage, the load imposed on the conveyors is such that it has been found preferable to employ a tractor both as motive power and as a source of power for operating the conveyors. Accordingly there is provided a drive bar or shaft 40 mounted on the frame for connection to an appropriate power take-off or drive mechanism on the tractor. This shaft is connected through a universal joint 41 and appropriate shafting 42 to a worm gear 43 mounted in a gear housing 44, the latter being attached to the side of the frame 1 and having a removable cover 45. The shafting 42 is preferably supported on the frame intermediate the universal joint and gear housing by a hanger or bracket 46. Within the housing the worm gear 43 enmeshes with a like gear 47 attached to one end of the shaft 48 of the transverse spiral conveyor 19. The shafting 42 extends through the housing 44 and, rearwardly thereof, is connected through a universal joint and appropriate shafting to a gear 49 mounted in the transverse gear box 24 and through the gear transmits power by appropriate gearing to the longitudinal spiral conveyors 23. Power for rotating the toothed shaft 19 is obtained by attaching a sprocket 50 to the end of the shaft of the transverse spiral conveyor 21 opposite that mounting the worm gear 47 and connecting the sprocket to a like sprocket 51 on the end of the shaft 19 by means of a chain 52. To maintain tension on the chain there may be provided a tensioning device comprising a tension arm 53 pivotally mounted on a yoke 54 connecting the sides of the frame and carrying a roller 55 for engaging the chain, the arm being urged downwardly by a spring 56.

The improved land conditioning machine operates in the manner hereinafter described. As previously stated, the machine is designed to be powered by a suitable tractor to which it is attached by a draw-bar 39, the tractor also being utilized for operating the driven parts of the machine by connecting the drive shaft 40 to a suitable power take-off on the tractor. Before traversing the land to be conditioned, the depths of the cutting wheel 12 and the cutting edge 10 of the plow are set for the depth of cut required both for planting and to rid the soil of vegetation and other debris. At the same time or later, as demanded by the contour of the land, the clearance of the rear end of the frame is set by adjusting the rear wheels 3 through the operating arms 5.

As the machine traverses the land the roller cutter 12 cuts the soil in a straight line defining or limiting the width of the ground to be plowed. The plow 9 then plows or turns up the soil up to the cut made by the cutter and to the depth for which the plow is set. This soil is forced backwardly as a continuous sheet along the upper face 11 of the plow. As the soil is lifted by the plow, it is brought into contact with the blades or paddles 20 on the transverse shaft 19. These blades or fingers bite into the continuous sheet of soil and, by paddle action, urge or propel it backwardly along the upwardly sloping face of the plow. By using blades that are bowed or bent backwardly toward their tips there is obtained at the same time a crushing or chopping of the soil sheet against the face of the plow which breaks or divides the sheet into individual segments. The backward or reverse bend also renders the blades practically self-cleaning.

As the divided soil approaches the upper rear end of the plow it is engaged by the helical blades of the transverse spiral conveyor 21. Rotating in the same direction as the paddles 20, these blades not only function as a conveyor for moving the soil backwardly along the conditioning machine but, by pressing or scraping the segments against the face of the plow 9, disintegrating the soil and separating it from the weeds and other debris with which it has been mixed or matted.

When they reach the upper edge of the plow the soil and other matter drop into the troughs 27 of the cradle 22 where the soil is thoroughly commingled and pulverized by action of the helical blades of the longitudinal spiral conveyors 23 and drops through the screen portion of the floor. Concurrently, the conveyors carry the weeds, stones and other waste or debris up through the troughs and deposit them at the entrance of the downwardly slanting shelf 29 of the chute 30. The debris then slides down the chute into the hopper 32 from which it may be dumped as desired. As the debris passes over the screen 35 in progressing down the chute the remainder of the soil is scraped off and dropped to the ground.

A feature of the invention is the particular configuration of the blades of the spiral conveyors 21 and 23. As illustrated these conveyors have flat or blunt edges causing them to both disintegrate the soil and separate the soil from the weeds by pounding or whipping action. Consequently the soil is separated from the weeds without breaking or cutting the latter into small pieces and by preventing pieces of weeds from falling through the screens 25 and 35, effectively remove weeds from the soil.

To inhibit erosion and prepare the soil for planting, two devices are utilized. One is a set of doors or panels 57 hingedly attached to the frame beneath the cradle 22. The set preferably comprises two pairs of doors, one under each of the troughs 27 with the inner doors hinged to a bar 58 disposed beneath the connecting web 28. The doors of each bar are laterally spaced to provide slots or openings through which the sifted soil drops onto the ground in the form of spaced ridges. By the manipulation of operating handles 59 the height and spacing of the ridges can be varied at will. Rearwardly of the doors is the raking device 36, the tines of which can be swung downwardly, when desired, to subdivide the ridges formed by the doors.

From the foregoing detailed description it is apparent that there has been provided an improved land conditioning machine by which soil containing weeds, brush, stones and other debris is plowed up and, after being carried over a series of connecting surfaces, is redeposited on the ground free of debris in erosion inhibiting ridges and so thoroughly pulverized and commingled that a high content of deep previously uncultivated soil does not hinder its immediate productivity. It will be understood that the described and illustrated embodiment is merely exemplary of the invention and that all modifications are intended to be included that depart neither from the spirit of the invention nor the scope of the appended claims. For example, the operating handles mounted at different positions on the machine can by appropriate extensions be manipulated from the front of the machine, thus enabling a single operator to make any of the various adjustments desired as the machine traverses the land. Other modifications will be apparent to those skilled in the art.

Having thus described my invention, I claim:

1. A land conditioning machine comprising a frame, a plow for plowing up from the ground soil containing debris as a continuous sheet, rotary means cooperating with said plow for crushing and dividing said sheet into segments, means cooperating with said plow rearwardly of said rotary means for disintegrating said segmented soil, longitudinal spiral conveyors mounted in a cradle having a foraminous floor for thoroughly pulverizing and commingling said soil and separating said pulverized soil from said debris, and adjustable doors positioned beneath said floor for redepositing said soil on the ground in rows of controlled size and spacing.

2. A land conditioning machine comprising a frame, a plow for plowing up from the ground soil containing debris as a continuous sheet, a rotary shaft having spaced backwardly bent fingers acting against said plow for crushing and dividing said sheet into segments, a transverse spiral conveyor cooperating with said plow for disintegrating said segmented soil, longitudinal spiral conveyors mounted in a cradle having a foraminous floor for thoroughly pulverizing and commingling said soil and separating said pulverized soil from said debris, and adjustable doors mounted beneath said foraminous floor for depositing said soil on the ground in rows of controlled size and spacing.

CLARENCE PATRICK PALMER.

REFERENCES CITED

The following references are of record in the file of this patent:

UNITED STATES PATENTS

| Number | Name | Date |
|---|---|---|
| 185,627 | Cole | Dec. 26, 1876 |
| 448,770 | Arrington et al. | Mar. 24, 1891 |
| 895,332 | Von Bertouch | Aug. 4, 1908 |
| 1,063,250 | Felt | June 3, 1913 |
| 1,287,749 | Rehberger | Dec. 17, 1918 |
| 1,494,458 | Campbell | May 20, 1924 |
| 1,714,889 | Raoult | May 28, 1929 |
| 1,747,645 | Palmer | Feb. 18, 1930 |

FOREIGN PATENTS

| Number | Country | Date |
|---|---|---|
| 1,310 | Great Britain | of 1856 |